(12) United States Patent
Talasco et al.

(10) Patent No.: US 6,514,044 B2
(45) Date of Patent: Feb. 4, 2003

(54) OFFSET CROWNED ROLLER ASSEMBLY FOR VARIABLE PITCH PROPELLERS

(75) Inventors: Eric J. Talasco, Windsor Locks, CT (US); Paul A. Carvalho, Westfield, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 21 days.

(21) Appl. No.: 09/745,912

(22) Filed: Dec. 21, 2000

(65) Prior Publication Data

US 2002/0081203 A1 Jun. 27, 2002

(51) Int. Cl.$^7$ ............................. B64C 11/06; F01D 7/00
(52) U.S. Cl. .................... 416/155; 416/167; 416/168 R
(58) Field of Search ............................. 416/167, 168 R, 416/168 A, 164, 162, 155, 156

(56) References Cited

U.S. PATENT DOCUMENTS

| | | | |
|---|---|---|---|
| 3,945,737 A | 3/1976 | Herbenar | 403/27 |
| 4,395,142 A | 7/1983 | Lobeck | 384/192 |
| 4,533,295 A | 8/1985 | Duchesneau | 416/27 |
| 5,022,821 A * | 6/1991 | Isert | 416/167 |
| 5,199,850 A * | 4/1993 | Carvalho et al. | 416/162 |
| 5,431,539 A * | 7/1995 | Carvalho | 416/168 R |
| 5,451,141 A * | 9/1995 | Carvalho et al. | 416/162 |
| 6,109,871 A * | 8/2000 | Nelson et al. | 416/167 |

FOREIGN PATENT DOCUMENTS

GB   2142990   1/1985

* cited by examiner

*Primary Examiner*—John G. Weiss
*Assistant Examiner*—Richard Woo

(57) ABSTRACT

The expense of a bearing employed at the interface of a yoke (22) and a propeller blade pin (14) in a variable pitch propeller assembly is reduced in a bearing construction (16) wherein a bearing race (48) includes a crowned surface (50) adapted to engage a slot (20) in the yoke (22) and having a profile ($P_i$) wherein the diameter at one side (88, 90) of the race (48) is less than the diameter at the opposite side (90, 88) of the race (48).

16 Claims, 2 Drawing Sheets

OFFSET CROWNED ROLLER ASSEMBLY FOR VARIABLE PITCH PROPELLERS

FIELD OF THE INVENTION

This invention relates to variable pitch propellers, and more particularly, to an improved bearing assembly that is located between the interface of a variable pitch propeller blade pin and a reciprocal actuator for changing the pitch of the blade.

BACKGROUND OF THE INVENTION

Many conventional variable pitch propeller systems use a scotch yoke type mechanism to convert linear motion of a hydraulic piston to rotational motion which rotates propeller blades in a hub to change their pitch. Such a pitch change mechanism requires a dynamic interface beetween the propeller blades and the yoke and actuator assembly. This interface must be capable of accommodating relative motion between the yoke and the propeller blade pins as well as handling misalignment between the components.

To provide these capabilities, conventionally two types of bearings have been employed. One type of bearing is a self-aligning spherical bearing while the other is a crowned roller bearing. To control the wear rate between the bearings and the yoke and actuator assembly, the contact stress level between the bearings and the yoke must be kept within a specific range. This is accomplished by sizing the bearings accordingly. In the usual case, for a given contact stress level held constant for a given load, self-aligning spherical bearings have the advantage of accommodating a larger misalignment between the components than a similar sized crowned roller bearing.

In order to increase the performance of crowned roller bearings, it would be desirable to increase the radius of curvature of the crown, thereby reducing contact stress at the point of contact of the bearing with the yoke. However, when this is done, as the parts flex during operation, if the height of the planar surface of the yoke is less than the end to end dimension of the bearing, the outer race surface of a crowned roller bearing tends to move toward a side edge of the planar surface of the yoke, that is, roll partially off the yoke surface. Alternatively, if the height of the planar surface of the yoke is greater than the end to end dimension of the bearing, the planar surface of the yoke tends to move toward an end of the bearing, that is, partially roll off of the bearing surface. Either way this results in a reduction in the area of contact between the two components, thereby increasing contact stress. Consequently, heretofore, it has not been possible to increase the radius of curvature of the outer race surface of a crowned roller bearing sufficiently to achieve the same operational capabilities as similarly sized self-aligning spherical bearing.

At the same time, the cost of a self-aligning spherical bearing is significantly greater than that of a crowned roller bearing. Thus, there is a need for a bearing that has the economic advantages of a crowned roller bearing which at the same time has the misalignment accommodating capabilities of a self-aligning spherical bearing. The present invention is directed to meeting that need.

SUMMARY OF THE INVENTION

It is the principal object of the invention to provide a new and improved bearing that may be used with cost effectiveness without sacrificing the capability of good misalignment managing qualities for use in a variable pitch propeller assembly.

An exemplary embodiment contemplates such a bearing in a variable pitch propeller assembly that includes a hub rotatable about a hub axis, at least one propeller blade having an end journaled in the hub for rotation about a blade axis that is generally perpendicular to the hub axis, a blade pin on the end of each blade and offset from the respective blade axis, a reciprocal blade actuator in the hub engaging the blade pins and operable, upon reciprocation, to cause the blades to rotate about the blade axes. The invention specifically contemplates bearings interposed between the reciprocal blade actuator and having rotatable races journaled on the blade pins with race surfaces that are surfaces of revolution engaging the reciprocal blade actuator. The improvement specifically includes the fact that the race surfaces have a somewhat lesser diameter at one side than at their other side.

In a preferred embodiment of the invention, the races have a crowned surfaced with a radius of curvature. The center point of the radius of curvature of the crowned surfaces is offset to one side of a plane perpendicular to the blade axis and extending through the center of the race.

In a highly preferred embodiment the center point is offset to be located between the blade and the center of the race.

In a preferred embodiment, each of the races includes a central bore with a step adjacent the end of the race remote from the blade and a polymeric bushing is disposed within the bore and abuts the step. The bushing is disposed about the blade pin and a retainer is mounted to the blade pin for retaining the race and the bushing on the blade pin.

Preferably, the bushing is formed of a polymer having high strength and low creep properties.

In a preferred embodiment, the retainer engages the bushing and is spaced from the race and the bushing.

In a highly preferred embodiment of the invention, the retainer is a cap-shaped element have an axial flange for receiving an end of the blade pin and with the axial flange closely adjacent the end of the bushing adjacent the step.

In addition, it is even more preferred that the cup-shaped element has a radial flange that overlies but is separated from the remote end of the race.

Other objects and advantages will become apparent from the following specification taken in connection with the accompanying drawings.

DESCRIPTION OF THE PREFERRED EMBODIMENT

An exemplary embodiment of a variable pitch propeller assembly embodying a bearing construction made according to the invention will be described in connection with a conventional hydraulically controlled system employing a so-called scotch yoke. However, it is to be understood that the invention may be employed in such variable pitch propeller assemblies that are controlled by non-hydraulic systems or hybrid systems. It is also to be understood that the invention may be employed with efficacy with other types of yokes of the type requiring a bearing at the interface between a propeller blade pin and the actuator.

Figure 1:
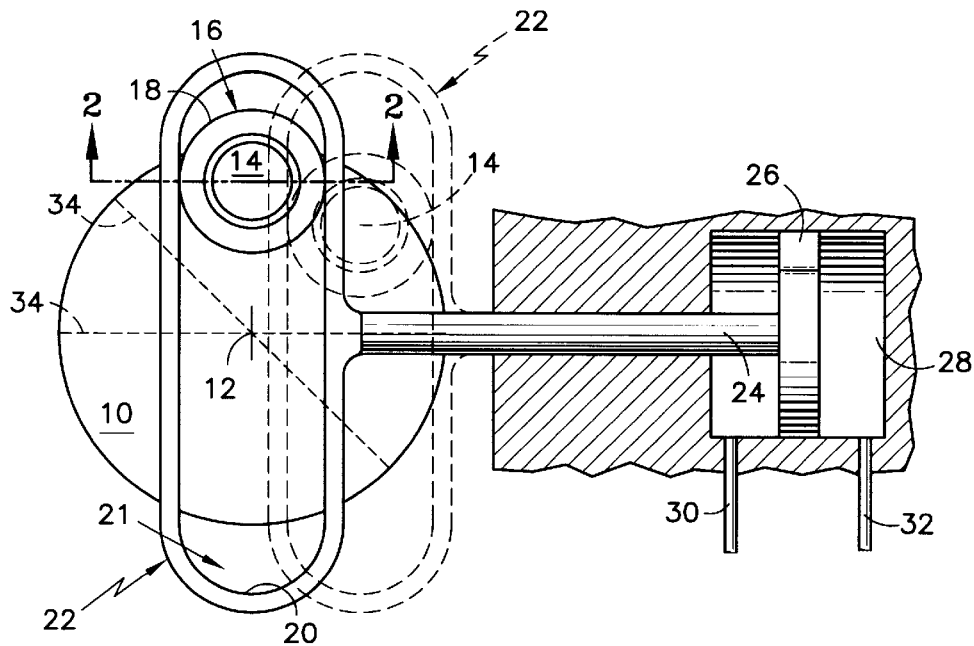
FIG. 1 is a schematic illustration of a typical reciprocating to rotary motion converting mechanism employed in one embodiment of a variable pitch propeller assembly made according to the invention.

Turning now to FIG. 1, the shank 10 of a propeller blade is shown and is rotatable about an axis 12 which typically will be transverse to the axis of rotation of the entire propeller assembly. While only one is shown, two or more blades, each having shank 10, will be utilized. The shank 10 includes a pin 14 offset or spaced from the axis 12 and on which a bearing, generally designated 16, is located. The bearing 16 includes an outer race surface 18 which is received in an elongated slot 21 of a scotch yoke mechanism, generally designated 22. The yoke mechanism includes an actuator arm 24 which is connected to the piston 26 of what is typically a double acting hydraulic cylinder 28. The cylinder 28 includes ports 30 and 32 which open to opposite sides of the piston 26. The air foil of the propeller blade is represented by a dotted line 34. As can be appreciated by those skilled in the art, movement of the piston 26 within the cylinder 28 will reciprocate the arm 24 and thus move the position of the slot 21 between a variety of positions in relation to the propeller blade axis 12 in a reciprocating path. One such position is illustrated in FIG. 1 in solid lines while another such position is illustrated in FIG. 1 in dotted lines. In this regard it is particularly to be noted that the positions illustrated in FIG. 1 are not intended to show limits of movement of the yoke assembly 22.

Because the pin 14, with the bearing 16 thereon, is located within the slot 21, the pin 14 will translate along with the slot 21. As the pin 14 is displaced from the rotational axis 12 of the blade, this will result in rotation of the shank 10, and thus the air foil 34, about the axis 12 to change the pitch of the propeller as commanded by the position of the piston 26 within the cylinder 28. More mechanically detailed explanations and depictions of the mechanism may be found, for example, in U.S. Pat. Nos. 5,836,743 and 6,077,040 issued respectively on Nov. 17, 1998 and Jun. 20, 2000, both to Paul A. Carvalho and Robert W. Pruden, the entire disclosures of which are herein incorporated by reference.

In some prior art devices, the bearing 16 is a conventional, self-aligning spherical bearing while in others, the bearing 16 is a conventional crowned bearing. As alluded to previously, self-aligning, spherical bearings are not attractive for the application because of their expense while conventional crowned bearings either cannot accommodate a misalignment that inherently occurs during operation of the variable pitch propeller assembly as a result of loading thereon or provide a relatively low contact stress level that enhances the life of the bearing. Thus, the invention contemplates the use of a crowned bearing as shown in FIGS. 2 and 3 and to be described in the following.

Figure 3:
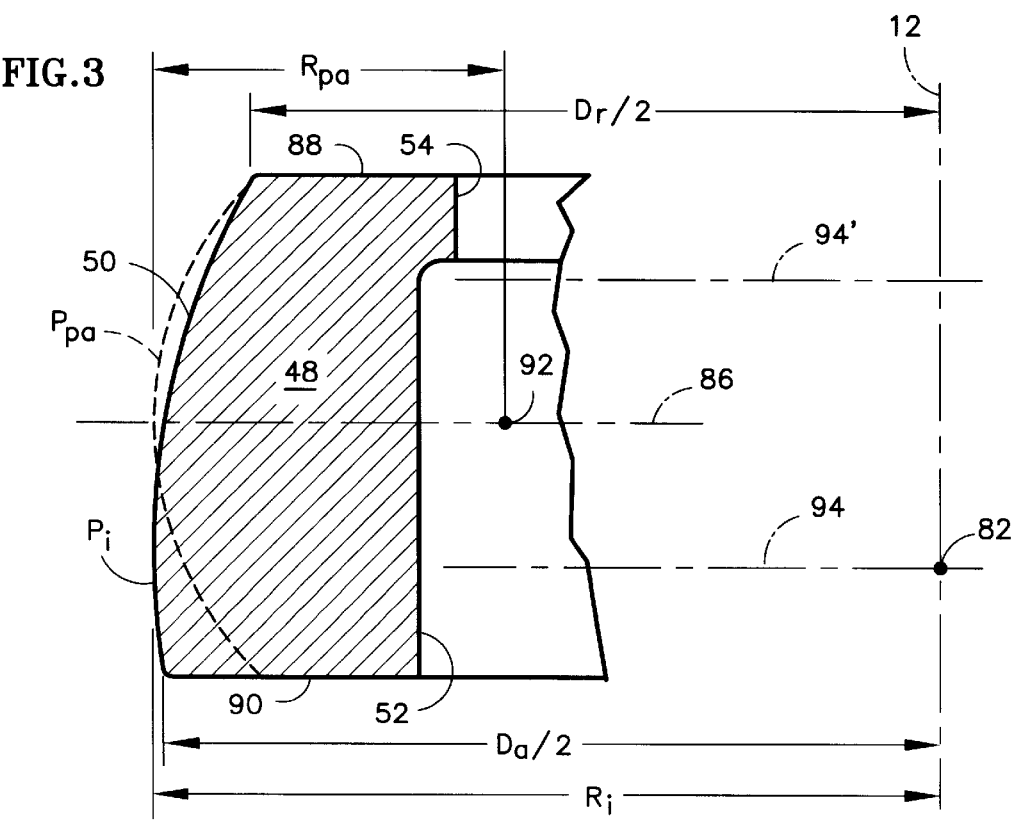
FIG. 3 is a further enlarged, fragmentary, sectional view showing the profile of an outer race employed in a bearing made according to the invention in highly exaggerated form.
Figure 2:
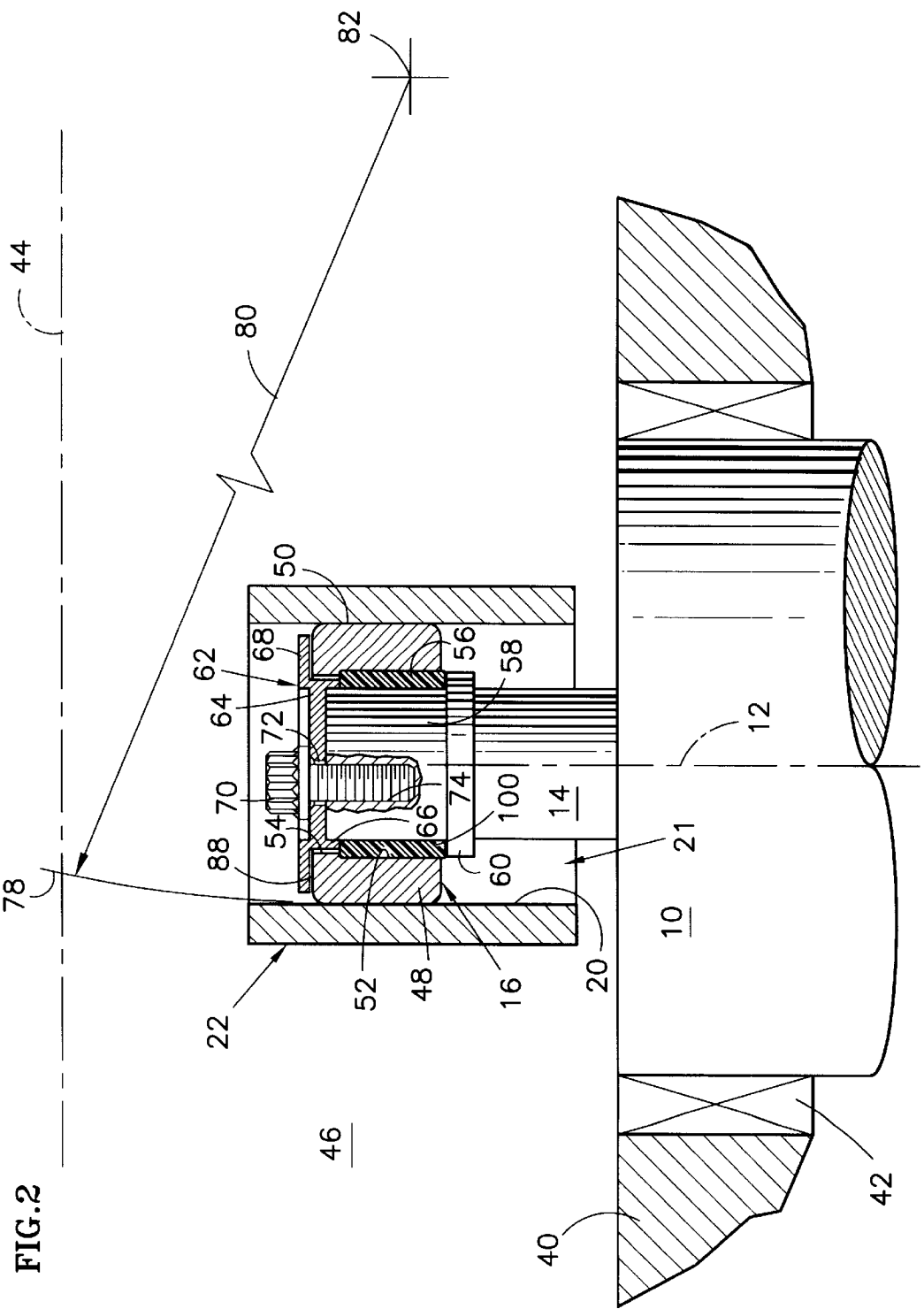
FIG. 2 is an enlarged, fragmentary, partial mechanical, partial schematic drawing taken approximately along the line 2—2 in FIG. 1.

Referring to FIGS. 2 and 3, a variable pitch propeller assembly hub is fragmentarily illustrated at 40 and by means of a conventional thrust and journal bearing system 42 journals the shank 10 of the propeller blade for rotation about the axis 12. The hub 40 is rotated about a rotational axis 44 that is transverse to the blade axis 12 by any suitable power plant.

The pin 14 extends inwardly into the interior 46 of the hub 40 to receive the bearing 16 located in the slot 21 of the yoke 22. According to the invention, the bearing 16 includes a crowned race 48 having a race surface 50 that engages the opposite sides of the slot 21. The race 48 includes a cylindrical bore 52 that terminates in a reduced diameter step 54 at the end of the race 48 that is most remote from the blade shank 10.

A bushing 56 is disposed within the bore 52 and abutted against the step 54. Preferably, the bushing 56 is manufactured of a low friction polymer, such as a poly(amide-imide) which has high strength and low creep properties. The bushing 56 is fitted about the pin 14 near an end 58 thereof and abutted against a shoulder 60, also formed or installed on the pin 14. As a consequence of the foregoing, the race 48 is free to rotate on the pin 14 as will typically be required to avoid wear as the pin 14 translates within the slot 21 as a result of reciprocal movement of the yoke 22. Further, the bushing 56 abuts the step 54.

A retainer, generally designated 62 is provided for retaining the bushing 56 and the race 48 thereon on the end 58 of the pin 14. The retainer is a generally cap-shaped piece 64 having a peripheral, axially extending flange 66 which is adapted to receive the end 58 of the pin 14. The flange 66 is closely adjacent the bushing 56 adjacent the step 54 for this purpose.

The retainer 64 also includes a peripheral, radially outward extending flange 68 which is spaced from, but overlies the race 48. A threaded retainer 70 secures the retainer 64 to the end 58 of the pin 14 and extends through an aperture 72 in the retainer 64 into a threaded bore 74 in the end 58. In the usual case, the spacing between the axial flange 66 and the bushing 56 is just less than the spacing between the radial flange 68 and the race 48.

FIG. 2 also indicates a line 78 that defines the race surface 50 of the race 48. The race 48 is, of course, a surface of revolution and its outer race surface 50 is likewise a surface of revolution having a radius 80 extending from a center point 82. It will be noted that the center point 82 defining the radius 80 will typically be displaced substantially from the rotational axis 12 of the blade shank 10 often a distance of ten inches or more.

FIG. 3 illustrates the profile defined by the line 78 for the race surface 50.

In a conventional crowned bearing, the center point such as the center point 82 for a radius will be located on a plane represented at 86 that passes through the mid-point of the race 48, that is, half-way between a side 88 that is most remote from the blade shank 10 and a side 90 that is closest to the blade shank 10. The showing in FIG. 3 is exaggerated and thus, the center 92 for the radius of curvature is located within the envelope of the bearing, which will not normally be the case, but on the plane 86 as is typical. The resulting prior art profile for the surface 50 is shown in dotted lines as $P_{pa}$ or profile of the prior art.

As noted previously, if it is attempted to increase radius of curvature of the profile $P_{pa}$, deflection of the parts during operation of the propeller structure can either result in the profile of $P_{pa}$ tending to roll off of the surface 20 of the yoke assembly 22 or the surface 20 of the yoke assembly 22 tending to roll off the profile $P_{pa}$; and when such occurs, contact stress at the point of contact of the profile $P_{pa}$ with the surface 20 will undesirably increase in spite of the greater radius of curvature of the profile $P_{pa}$.

However, according to the invention, and as illustrated in FIGS. 2 and 3, center 82 or the radius 80 is displaced to one side of the plane 86. As illustrated in FIG. 3, the center 82 for the radius 80 is displaced to lie in a plane 94 parallel to the plane 86 and located between the plane 86 and the shank 10. This represents the desired location for the situation where there is more deflection during operation in the yoke assembly 22 at the surface 20 (FIGS. 1 and 2) than in the pin 14. Where the situation is reversed, that is, where there is greater deflection in the pin 14 during operation than in the yoke assembly 22 at the surface 20, the plane 94 will be located to the other side of the plane 86, as, for example, to a location 94' as shown in FIG. 3. As illustrated, the plane 94 is located approximately midway between the plane 86 and the side 90 whereas the plane 94' is located approximately midway between plane 86 and the side 88. The actual position will be dependent upon the contact stress level and misalignment position to be met for a particular application. As a consequence, the solid line profile $P_i$ or profile of the invention defines the profile 50. It will be appreciated that the radius of curvature for the profile $P_i$ is substantially greater than the radius of curvature for the profile $P_{pa}$ which is to say that the profile will be flatter and thus the total stress at the contact will be spread out over a greater area thereby reducing the contact stress that occurs in a bearing made according to the invention over that which occurs in a prior art crowned bearing for the same loading. Importantly, because the center of the radius of curvature for the profile $P_i$ is moved from a plane passing through the center of the bearing to one side thereof, the bearing effectively is provided with a greater contact area between its end farthest from a plane passing through the new center for the radius of curvature for the profile $P_i$. This means more deflection to that side of the area may be accommodated because of the greater contact area, thereby providing the crowned bearing system with misalignment handling capabilities comparable with self-aligning spherical bearings without encountering the undesirable tendency to "roll off" the yoke or the bearing surface, as the case may be, in operation. The differences in the radii of curvature for both the prior art profile and a profile made according to the invention are illustrated respectively at $R_{pa}$ and $R_i$ in FIG. 3.

In the illustrated embodiment, that is, for the situation where there is more deflection in the yoke assembly 22 at the surface 20 than in the pin 14, the race 48 has a lesser diameter at its remote side 88 than at its side 90 adjacent to the blade shank 10. Thus, for example, if the line 12 shown in FIG. 3 is considered to be the axis of rotation of the race 48, remote side radius is shown at $D_{r/2}$ while the adjacent side radius is shown at $D_{a/2}$. For the situation where there is more deflection in the pin 14 than in the yoke assembly 22 at the surface 20, the race 48 will have a lesser diameter at its adjacent side 90 than at its remote side 88, just the opposite of what is shown in FIG. 3.

The reason for these relations is as follows. For the illustrated situation, namely, where application in the yoke assembly 22 is greater than in the pin 14, when loading causes misalignment, the blade will skew ever so slightly about some point located within its shank 10 within the bearing system 42. Further, the pin 14 will deflect a relatively small amount while the surface 22 will be deflected a greater amount. Though angular displacement of the pin 14 will be generally the same along its length, actual linear displacement will be greater the further one proceeds along the length of the pin 14 from the shank 10. Consequently, there will be more displacement at the remote side 88 of the race than there will be at the adjacent side 90 of the race but this displacement can be accommodated without the profile $P_i$ rolling off of the surface 20 or the surface 20 rolling off the profile $P_i$ because the greater displacement is accommodated by the profile $P_i$. As a consequence, by locating the radius of curvature between the plane 86 and the adjacent side 90, for the particular situation of concern, a degree of misalignment associated with self aligning spherical bearings can be accommodated along with the associated low contact stresses.

On the other hand, for the opposite situation, that is, where the deflection of the pin 14 is greater than the deflection in the yoke assembly 22 at the surface 20, the point of contact between the outer race surface 50 and the surface 20 will move inwardly toward the shank 10 but this will be accommodated by a reversed or inverted profile $P_i$ in the same fashion. Again, a degree of misalignment associated with self aligning spherical bearings can be accommodated along with the associated low contact stresses.

Another advantage of the invention includes the following. The use of the step 54 in the bore 52 of the race 48 prevents relative motion between the bushing 56 and the race 48 during operation. As a consequence, a washer conventionally employed between the bearing and the shank 10 of the blade is totally eliminated, reducing cost and complexity.

The use of the bushing 56 which is slightly spaced from the axial flange 66 of the retainer 64, eliminates metal to metal contact that could otherwise occur with a conventional support plate or washer employed at this location. Consequently, the wear rate between the various components is reduced.

Similarly, the use of the bushing 56 eliminates metal to metal contact that would occur in prior art designs between the race 48 and the sleeve 60, again allowing elimination of a washer and reducing the wear rate.

Still a further advantage of the invention, and particularly, the form of the retainer 64 works to assure proper assembly. Specifically, if the race 48 and bushing 56 are installed in inverted position, the axial flange 66 will engage a part 100 of the bushing 56 that extends out of the bore 52 and the remote side 88 of the race 48 will engage the shoulder 60 when the retainer 64 is secured to the pin 14. As a consequence, the bearing will not freely rotate which will serve to remind the assembler that assembly has been improper.

At the same time, if the retainer 64 is installed in an inverted condition, the axial flange 68 will engage the remote surface 88 of the race 48 and again halt rotation, providing an alerting condition to the assembler that things are not correct.

In the event that the race 48 and bushing 56 as well as the retainer 64 are installed in an inverted position, the axial flange 68 will engage a port 100 of the bushing 56 that extends out of the bore 52 and the remote side 88 of the race 48 will engage the shoulder 60 when he retainer 64 is secured to he pin 14. Again, the bearing will not freely rotate to remind the assembler that the assembly is improper.

Consequently, it will be readily appreciated that the bearing made according to the invention possesses numerous advantages over those heretofore used. The same has the desirable economics of a conventional crowned bearing but with the misalignment accommodating capability of a more expensive self-aligning spherical bearing. Contact stresses over similar crowned bearings are minimized and numerous secondary benefits flow from use of the structure.

We claim:

1. In a variable pitch propeller assembly including a hub rotatable about a hub axis, at least one propeller blade having an end journaled in said hub for rotation about a blade axis that is generally perpendicular to said hub axis, a blade pin on said end of each blade and offset from the respective blade axis, a reciprocal blade actuator in said hub engaging said blade pin and operable, upon reciprocation, to cause said blades to rotate about said blade axes, and bearings interposed between said reciprocal blade actuation and said blade pins, the improvement wherein each said bearing includes a race having a crowned surface with a predetermined radius of curvature engaging said reciprocal blade actuator, the center point of the radius of curvature of said crowned surface being offset to one side of a plane perpendicular to said blade axis and extending through the center of the race.

2. In a variable pitch propeller assembly including a hub rotatable about a hub axis, at least one propeller blade having an end journaled in said hub for rotation about a blade axis that is generally perpendicular to said hub axis, a blade pin on said end of each blade and offset from the respective blade axis, a reciprocal blade actuator in said hub engaging said blade pin and operable, upon reciprocation, to cause said blades to rotate about said blade axes, and bearings interposed between said reciprocal blade actuator and said blade pins and having rotatable races journaled on said blade pins and crowned race surfaces that are surfaces of revolution engaging said reciprocal blade actuator, the improvement wherein said race surfaces have a somewhat lesser diameter at one of their ends than at their opposite ends.

3. The variable pitch propeller of claim 2 wherein each said race includes a central bore with a step adjacent said remote end, a polymeric bushing within said bore and abutting said step and disposed about said blade pin, and a retainer mounted to said blade pin retaining said race and said bushing on said blade pin.

4. The variable pitch propeller assembly of claim 3 wherein said bushing is formed of a polymer having high strength and low creep properties.

5. The variable pitch propeller assembly of claim 3 wherein said retainer is spaced from said race and said bushing.

6. The variable pitch propeller assembly of claim 5 wherein said retainer is a cap-shaped element having an axial flange for receiving an end of said blade pin and said axial flange is closely adjacent an end of said bushing adjacent said step.

7. The variable pitch propeller assembly of claim 6 wherein said cap-shaped element further includes a radial flange overlying, but spaced from said race remote end.

8. The variable pitch propeller assembly of claim 7 wherein each of said race surfaces has a radius of curvature whose center is offset to a location to a side of a plane perpendicular to the respective blade axis and extending through the center of the corresponding race.

9. The variable pitch propeller assembly of claim 8 wherein said location is to a side of said plane closest to said blade.

10. The variable pitch propeller assembly of claim 8 wherein said location is between said plane and said race end adjacent said blade.

11. The variable pitch propeller assembly of claim 2 wherein said one ends are ends remote from said blade and said opposite ends are ends closet to said blades.

12. In a variable pitch propeller assembly including a hub rotatable about a hub axis, at least one propeller blade having an end journaled in said hub for rotation about a blade axis that is generally perpendicular to said hub axis, a blade pin on said end of each blade and offset from the respective blade axis, a reciprocal blade actuator in said hub engaging said blade pin and operable, upon reciprocation, to cause said blades to rotate about said blade axes, and bearings interposed between said reciprocal blade actuator and said blade pins and having rotatable races journaled on said blade pins and race surfaces that are surfaces of revolution engaging said reciprocal blade actuator, the improvement wherein said race surfaces have a somewhat lesser diameter at one of their ends than at their opposite ends, each said race including a central bore with a step adjacent said one end, a bushing formed of a polymer having high temperature resistance and low creep properties within said bore and abutting said step and disposed about said blade pin, and a cap-shaped retainer having an axial flange receiving an end of said blade pin and secured thereto with the axial flange closely adjacent an end of said bushing adjacent said step and a radial flange overlying but spaced from said race one end.

13. The variable pitch propeller assembly of claim 12 wherein each of said race surfaces has a radius of curvature whose center is offset a location to the side of a central plane perpendicular to the respective blade axis and extending through the center of the corresponding race.

14. The variable pitch propeller assembly of claim 13 wherein said location is to a side of said plane closest to said blade.

15. The variable pitch propeller assembly of claim 14 wherein said location is between said plane and the race end closest to said blade.

16. The variable pitch propeller assembly of claim 12 wherein said one ends are ends remote from said blade and said opposite ends are ends closet to said blades.

\* \* \* \* \*